United States Patent [19]
Lancaster

[11] Patent Number: 5,706,856
[45] Date of Patent: Jan. 13, 1998

[54] VALVE APPARATUS

[76] Inventor: Robert D. Lancaster, P.O. Box 270244, Houston, Tex. 77277

[21] Appl. No.: 422,781

[22] Filed: Apr. 17, 1995

[51] Int. Cl.$^6$ .............................. F16K 37/00; F16K 47/08
[52] U.S. Cl. ............................... 137/556.3; 137/625.37; 251/268; 251/282
[58] Field of Search ........................ 137/625.37, 625.33, 137/625.3, 556.6, 556.3, 556; 251/267, 268, 269, 282

[56] References Cited

U.S. PATENT DOCUMENTS

| | | | |
|---|---|---|---|
| 43,949 | 8/1864 | Miller | 137/625.37 |
| 2,584,847 | 2/1952 | Dahl | 137/556.3 |
| 2,642,254 | 6/1953 | Armstrong | 137/625.37 X |
| 3,085,592 | 4/1963 | Zajac et al. | 137/556 |
| 3,648,718 | 3/1972 | Curran | 137/625.37 X |
| 4,540,022 | 9/1985 | Cove | 137/625.37 X |
| 4,569,370 | 2/1986 | Witt | 137/624.37 X |
| 4,569,503 | 2/1986 | Karr, Jr. | 137/556.3 X |
| 4,573,492 | 3/1986 | Tadokoro | 137/625.3 X |
| 4,860,993 | 8/1989 | Goode | 137/625.37 X |
| 5,086,808 | 2/1992 | Pettus | 137/625.37 X |

*Primary Examiner*—John Rivell
*Attorney, Agent, or Firm*—Bill B. Berryhill

[57] ABSTRACT

A choke valve having a valve body in which is a valve chamber with in inlet and an outlet. A valve seat is carried in the valve chamber. A flow control member is also carried in the valve chamber for axial movement with respect to the valve seat from a closed position, preventing flow of fluids from the valve inlet to its outlet, and selected open positions which provide predetermined flow areas through which flow and pressure throttling of fluids may occur. A non-rotating stem assembly is attached to the control member for axial movement thereof. A valve bonnet is attached to the valve body and provided with a throughbore in which the stem assembly may slidingly reciprocate while positioning the flow control member. A rotating driver assembly is supported from the valve bonnet and includes a nut member threadedly engageable with another end of the stem assembly. The nut translates rotational movement of the driver assembly to axial movement of the stem assembly and the flow control member attached thereto. An operating device is attached to the driver assembly for rotation thereof.

25 Claims, 5 Drawing Sheets

VALVE APPARATUS

BACKGROUND OF THE INVENTION

1. Field of the Invention

The present invention pertains to valve apparatus for controlling flow of fluids. In particular, it pertains to valve apparatus commonly referred to as "chokes" for controlling the flow of fluids from or to an oil and/or gas well. More specifically, the present invention pertains to valve apparatus suitable for controlling the flow of fluids from a well during production.

2. Description of the Prior Art

In the oil and gas industry, various types of valves or flow control devices are used both during drilling and production operations. One control device used in drilling is the "drilling choke". The drilling choke is one of several well control devices used to control the fluid pressures and volumes encountered during drilling to prevent potential loss of control of the well.

Choke valves are also used in the production of oil and/or gas. These chokes are usually referred to as "production chokes". The production choke may be used to throttle pressure and control the rate of production of petroleum fluids from a well. Production chokes may also be used to control and throttle the flow of fluids being injected into a well, such as is done in enhanced oil recovery operations.

Because of the pressures, rate of flow and characteristics of petroleum fluids, most chokes encounter erosion and corrosion problems. Manufacturers have attempted to reduce these problems with numerous types of flow regulating or control elements which are placed in the choke or valve chamber to throttle and control fluids passing therethrough. If the flow regulating or control element is damaged and in need of repair or replacement, the valve may require time consuming and expensive repairs.

Another problem associated with production chokes is the inability to precisely determine the position of the flow control or regulating element of the valve and the flow area related thereto. Since the flow area changes with the position of the flow regulating element therein, such positions need to be accurately determined for precise flow control. Most mechanisms of the prior art for doing so involve relatively complex manufacturing processes which are not easily duplicated.

Another problem associated with production chokes is the force required for operation thereof. Due to the relatively high pressures associated therewith and the unbalanced forces due to such pressures, many production chokes require operating forces greater than desired, particularly for remote operation. Many of today's oil and/or gas wells are remotely operated by satellite or other means. The production chokes of such wells are preferably operated by low power DC electric motors. This is not possible with many production chokes of the prior art.

SUMMARY OF THE PRESENT INVENTION

The valve apparatus of the present invention is a production choke, primarily for the oil and/or gas industry, which provides a number of improved characteristics not found in the prior art. It provides a choke which is less susceptible to erosion and corrosion and easier to repair when so affected. It provides accurate position and flow area information for precise control of fluid flow therethrough, utilizing a unique position indicator. In addition, it is extremely easy to operate, requiring less than eighteen (18) foot pounds of torque as compared to one hundred eighty (180) foot pounds for a typical prior art production choke operating at pressures of 10,000 psig.

The choke valve of the present invention has a valve body in which is a valve chamber with an inlet and an outlet. A valve seat is carried in the valve chamber. A flow control member is also carried in the valve chamber for axial movement with respect to the valve seat from a closed position, preventing flow of fluids from the valve inlet to its outlet, and selected open positions which provide predetermined flow areas through which flow and pressure throttling of fluids may occur. A non-rotating stem assembly is attached to the control member for axial movement thereof. A valve bonnet is attached to the valve body and provided with a throughbore in which the stem assembly may slidingly reciprocate while positioning the flow control member. A rotating driver assembly is supported from the valve bonnet and includes a nut member threadedly engageable with another end of the stem assembly. The nut translates rotational movement of the driver assembly to axial movement of the stem assembly and the flow control member attached thereto. An operating device is attached to the driver assembly for rotation thereof.

In a preferred embodiment of the invention the seat is provided in a unique cage member which cooperates with the flow control member attached to the stem assembly and providing predetermined flow areas in response to selected positions of the flow control member and stem assembly to which it is attached. The cage may include an inner cage of very hard erosion resistant material surrounded by an outer cage of less exotic materials.

The stem assembly of the present invention, which may include an upper stem and a lower stem, reciprocates within an annular seal assembly carried in the throughbore of valve bonnet. In a preferred embodiment the lower stem is of two diameters leaving an annular space which, in cooperation with the annular seal assembly and a flow passage through the control member and stem, results in a semi-force balanced stem. The semi-force balanced stem and the driver assembly of the valve results in a valve with much reduced load and operating torque especially suitable for remote operation.

In a preferred embodiment of the valve of the present invention a unique indicating assembly is provided which includes a cylindrical drum attached to the driver assembly for rotation therewith. The outer surface of the drum has helically disposed indicia thereon which in combination with a pointer device attached to the non-rotating stem assembly indicates a specific position of the flow control member and the predetermined flow area associated therewith.

Thus, the unique valve of the present invention provides a production choke suitable for the oil and/or gas industry which provides accurate predetermined flow control with improved operating characteristics. It is especially suitable for accurate and remote control. Many other objects and advantages of the invention will be apparent from reading the description which follows in conjunction with the accompanying drawings.

DESCRIPTION OF A PREFERRED EMBODIMENT OF THE INVENTION

Figure 1:
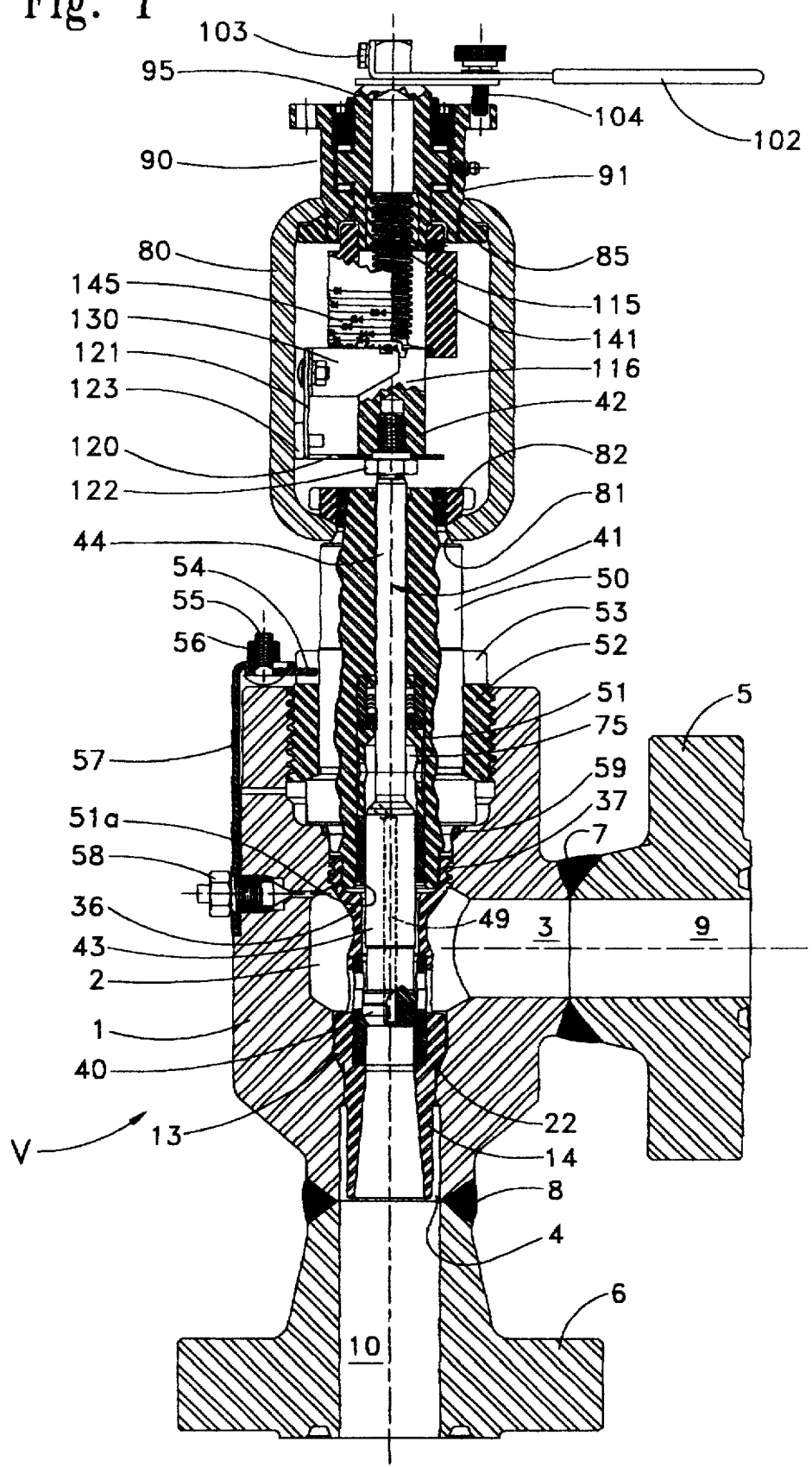
FIG. 1 is an elevation view, partially in section, showing the choke valve of the present invention, according to a preferred embodiment thereof.

Referring first to FIG. 1 there is shown a choke or valve V having a valve body 1 with a chamber 2. The chamber 2 is provided with inlet and outlet ports 3, 4 and closed at its upper end by valve bonnet 50. Flanges 5 and 6 are shown welded to the valve body 1 at 7 and 8. The flanges 5 and 6 are provided with throughbores 9 and 10 which communicate with inlet and outlet ports 3, 4, respectively. The flange 5 would be connected to a corresponding flange at a well head or a pipe extending therefrom for fluid communication with oil and/or gas exiting a well. The flange 6 would be connected to the flange of a pipe or conduit through which the gas and/or oil exiting the valve V would pass.

Figure 2:
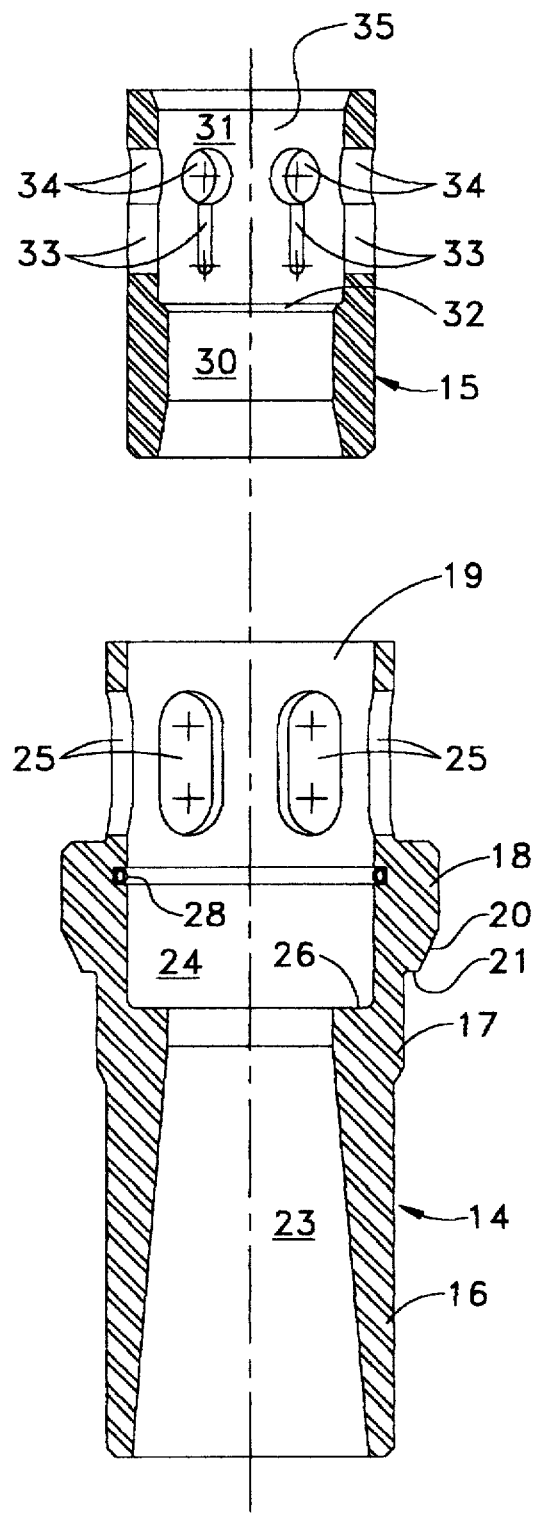
FIG. 2 is an exploded longitudinal view, in section, of a two part seat assembly of the choke valve of FIG. 1, according to a preferred embodiment thereof.

The valve body 1 is machined at the lower end of the chamber 2 to receive a seat assembly 13. The seat assembly 13, in the exemplary embodiment, as best seen in FIG. 2, comprises two members, an outer seat carrier 14 and an inner seat insert 15. The outer seat housing 14 is a tubular member which is provided with a lower, smaller diameter portion 16, a slightly larger diameter portion 17, a larger diameter shoulder portion 18 and an upwardly extending cage portion 19. The shoulder portion 18 may be tapered as at 20 and machined to seat in a corresponding tapered portion of the valve body 1. An annular surface 21 may be provided, cooperating with the cylindrical surface of 17, to seal against an annular seal 22 within the valve body 1 (see FIG. 1). The seat carrier 14 may be provided with a throughbore 23 (shown tapered in the exemplary embodiment) and a counterbore 24 which defines the inner surface of the cage portion 19 and provides an upwardly facing annular shoulder 26. An annular groove may be provided to receive an annular seal 28. The cage portion 19 (outer cage) of the seat carrier 14 is provided with elongated longitudinally disposed radial slots 25.

The seat insert 15 is of a substantially harder material than the material of the seat carrier 14 and has a cylindrical exterior which is precisely machined for shrink or interference fit into the counterbore 24 of the seat carrier 14. When properly in place, the insert 15 and seat carrier 14 will appear as in FIG. 1. The interference fit and annular seal 28 cooperate to seal between the carrier and insert 14, 15. The seat insert 15 has a throughbore 30 which, when in proper place, communicates with the bore 23 of the seat carrier 14. The throughbore 30 is counterbored to provide counterbore 31 at the lower end of which is a tapered seating surface 32 for engagement with a flow control member to be described hereafter. The upper portion of the seat insert 15 forms what may be referred to as an inner cage 35. The inner cage 35 is also provided with radial elongated slots 33 which, when properly placed within the seat carrier 14 are generally registerable with the elongated slots 25 thereof. In the exemplary embodiment, the elongated slots 33 have holes 34 at the ends thereof to form a keyhole shaped opening. The holes 34 could also be elongated slots which would be wider than slots 33 so as to form elongated keyhole shaped openings. It will also be noted that the slots 33 of inner cage 35 are smaller than the slots 25 of the seat carrier outer cage 19. Thus, the inner slots 33 determine the flow areas through valve V and provide the pressure throttling thereof. It is for this reason the insert 15 is of a much harder material than the seat carrier 14 and may be replaced when required without having to replace carrier 14.

The seat carrier 14 and seat insert 15 are held in place by a tubular seat retainer 36 which, as seen in FIG. 1, has an upper enlarged threaded portion 37 which engages corresponding threads in the valve body 1 just above the chamber 2. The lower end of the retainer 36 bears against the upper ends of carrier 14 and insert 15 to force the seat assembly 13 against seal 22 and surrounding surfaces of valve body 1 and port 4. The enlarged threaded portion 37 of seat retainer 36 is counterbored to receive the lower end of valve bonnet 50. The seat retainer 36 is a universal retainer which does not require close tolerances and which can be used with other seat assemblies. It also eliminates the need for close tolerance threads on the seat assembly.

Referring again to FIG. 1, a flow control member, in the exemplary embodiment a plug 40 is carried in the valve chamber 2 attached to a stem assembly 41. The plug or control member 40 (which could also be a needle or other type of control member) is axially movable, with respect to the valve seat 32, from a closed position engaging valve seat 32 preventing fluids from flowing through the valve V to selected open positions which provide for flow between the valve inlet 3 and outlet 4. Depending upon the position of the plug 40 within the inner cage 35, a predetermined flow area will be provided by the keyhole slots 33 through which the inlet and outlet of the valve communicates. As previously stated, the radial slots 25 in the outer cage 19 of seat carrier 14 are larger than those in the inner cage 35 of seat insert 15. Thus, very little throttling and erosion will take place in these larger slots 25. For this reason, the outer seat carrier 14 can be more economically provided of softer material. The primary throttling will occur through the slots 33 of the harder material insert 15. If after a period of time there is substantial erosion of the slots 33, the insert 15 may be removed and replaced with a new one.

As stated, the plug or control member 40 is attached to the lower end of a stem assembly, which in the exemplary embodiment comprises a lower stem 41 and an upper stem 42. The lower stem has a larger diameter lower portion 43 and a smaller diameter upper portion 44. The lower stem 41 is surrounded by a valve bonnet 50 and an annular sealing assembly 51 carried in a cylindrical cavity of the valve bonnet 50. It will be noted that a portion of the larger diameter portion 43 of the lower stem is undercut, directly above plug 40. This reduces plating and grinding of the stem and provides relief around plug 40 to prevent potential binding thereof. It also increases the volume of the valve chamber reducing velocity in areas not protected by hardened materials.

The valve bonnet 50 is held in place by a large surrounding retainer nut 52 which is threaded for threaded engagement with corresponding threads of the valve body 1. The bonnet 50 and body 1 are provided with tapered surfaces which seal against an annular seal 59. Upwardly projecting lugs 53 on the retainer nut 52 are used to secure this engagement. It will be noted that a metallic plate 54 with corresponding tabs (not shown) engages these lugs 53 and carries (in a limited arc arcuate slot) a screw 55 and nut 56 which is in turn attached to a strip of metal 57 or the like which lies along side the valve body 1 and is in turn engaged by a bleed-fitting 58. The nut 56 may be loosened but not removed from screw 55. To fully disengage the bonnet retainer nut 52 so that inner parts of the valve V may be replaced or repaired, it is necessary to disengage the bleed fitting 58. In so doing, the valve chamber 2 is vented to the atmosphere so that the valve V will not be disassembled under pressure.

Figure 3:
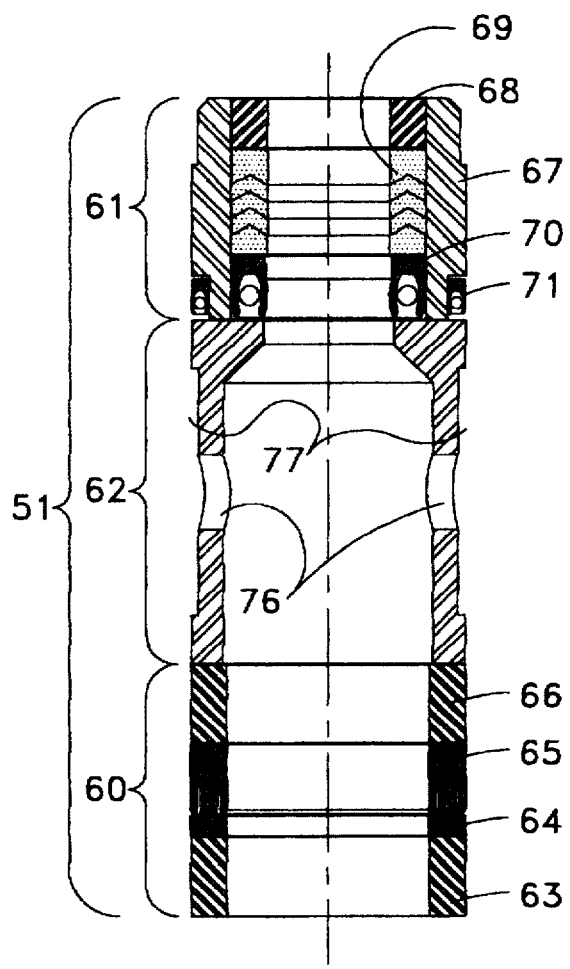
FIG. 3 is a longitudinal view, in section, of a seal assembly for sealing around the stem assembly of the valve of FIG. 1, according to a preferred embodiment thereof.

The seal assembly 51, as best seen in FIG. 3, comprises a lower seal assembly 60, an upper seal assembly 61 with a spacer or lantern ring 62 therebetween. The entire seal assembly 51 may be placed in the uniform cylindrical cavity provided therefor in valve bonnet 50 and held in place by a single spring ring retainer 51a. The lower seal assembly 60 comprises a lower stem bearing ring 63, hat ring 64, seal 65, and an upper stem bearing 66. The upper seal assembly 61 comprises an outer cartridge housing 67, a stem bearing 68, packing 69 and inner and outer lip seals 70, 71. The lower seal assembly 60 seals against the surrounding valve bonnet cavity and the larger diameter portion 43 of the lower stem (see FIG. 1). The upper seal assembly 61 seals against the valve bonnet cavity and against the smaller diameter upper portion 44 of the lower stem. Of course the configuration of the seal assemblies 60, 61 may be changed. For example, the upper seal assembly 61 may have another independent inner lip seal instead of packing 69.

It will be noted in FIG. 1 that the plug 40 and the larger diameter portion 43 of the lower stem is provided with a small longitudinal passage 49 through which pressure below the plug 40 may be communicated to the annular space 75 between lantern ring or spacer 62 and the smaller diameter stem portion 44. Thus, any forces created by pressure in outlet port 4 against the plug 40 are at least partially offset by the same pressure being communicated to the annular area between the diameters of the smaller stem portion 44 and larger stem portion 43 within annular space 75.

Referring also to FIG. 3 it will be noted that the spacer or lantern ring 62 which surrounds the annular space 75 is provided with radial holes 76 and is relieved on its exterior to provide annular spaces 77. These holes 76 and annular spaces 77 allow accumulation of small solids and hydrocarbons which might otherwise hinder reciprocation of the stem assembly 41.

Mounted above the bonnet 50 is a yoke 80 and driver assembly 90. See also FIG. 4. The yoke 80 has a lower tapered central opening 81 which rests on a corresponding tapered shoulder of the valve bonnet 50 and is securely fastened thereto by a large retainer nut 82 which threadedly engages at 83 an upwardly extending corresponding threaded portion of the valve bonnet 50. The yoke 80 also has an upper tapered central opening 84 for receiving a corresponding tapered shoulder of a bearing housing 91 which makes up a portion of the driver assembly 90. This connection is securely held in place with a large retainer nut 85 which engages at 86 corresponding threads on the lower end of the bearing housing 91. The tapered central openings 81, 84 of yoke 80 concentrically align and axially space the drive assembly 90, the yoke 80, the bonnet 50, the stem assembly 41 and related parts. The yoke member 80 is opened along at least one side and preferably both sides thereof to provide physical and visual access to the upper stem 42 and other components located on the interior of the yoke member 80 (several of which will be described hereafter).

Figures 4, 4A:
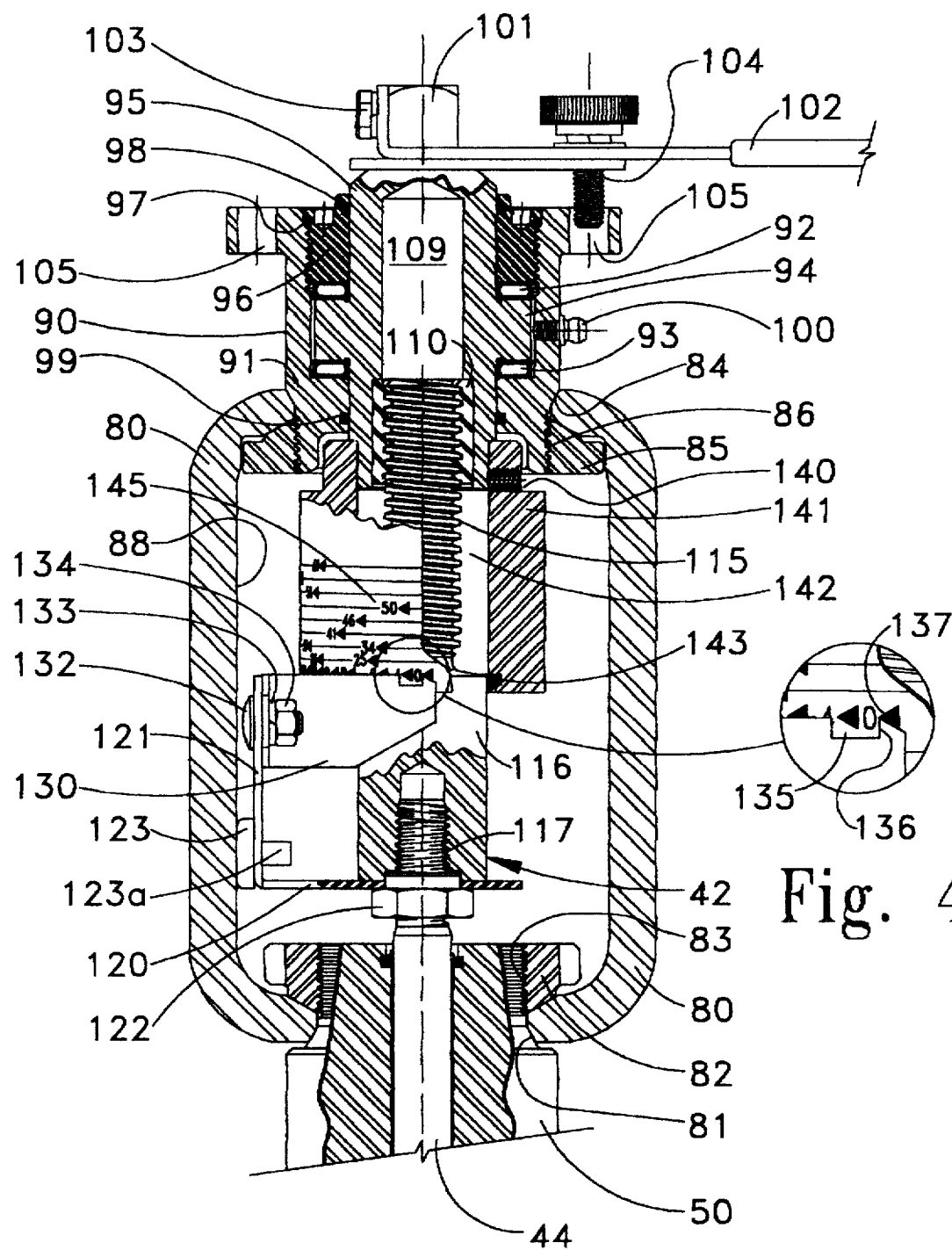
FIG. 4 is an enlarged elevation view, partially in section, of the upper portion of the choke valve of FIG. 1.
FIG. 4a is an enlarged detail of the circled portion of FIG. 4.

As perhaps best seen in FIG. 4, the driver assembly 90, in addition, to the bearing housing 91 includes upper and lower thrust bearings 92, 93, each with upper and lower races, which are disposed on opposite sides of shoulder 94 of a central force transmitting member 95. The force transmitting member 95 and bearings 92, 93 are maintained in place by bearing retainer ring 96 which threadedly engages corresponding threads in the bearing housing 91. A static seal 97 and dynamic seals 98 and 99 seal these connections. A lubrication fitting 100 permits lubrication of the bearings 92, 93. Attached to the upper extension 101 of the force transmitting member 95 is an operating handle or lever 102. It may be fastened with a screw 103. It may also be provided in an arcuate slot (not shown) with a downwardly extending screw 104 which can be placed in engagement with a selected radial hole 105 of a flange extension of the bearing housing 91 to lock the handle 102 in place.

The force transmitting member 95 has a bore 109 which is counterbored to receive, in a secure shrink fit therewith, an internally threaded nut 110. The nut 110 may be of a material such as bronze. The nut 110 is in turn threadedly engaged with an upper threaded portion 115 of the upper stem 42. The upper stem 42 has a lower, larger diameter cylindrical portion 116 the lower end of which is internally threaded to receive in a threaded connection 117 a threaded portion at the upper end of lower stem 41. Assuming that the stem assembly 41, 42 does not rotate, rotation of the force transmitting member 95 of the driver assembly 90 will, through the nut 110, translate rotational movement to axial movement of the stem assembly 41, 42. As the lower stem 41 and upper stem 42 move up, the threaded end 115 of upper stem 42 will move upwardly within the closed cylindrical bore or cavity 109.

Figure 5:
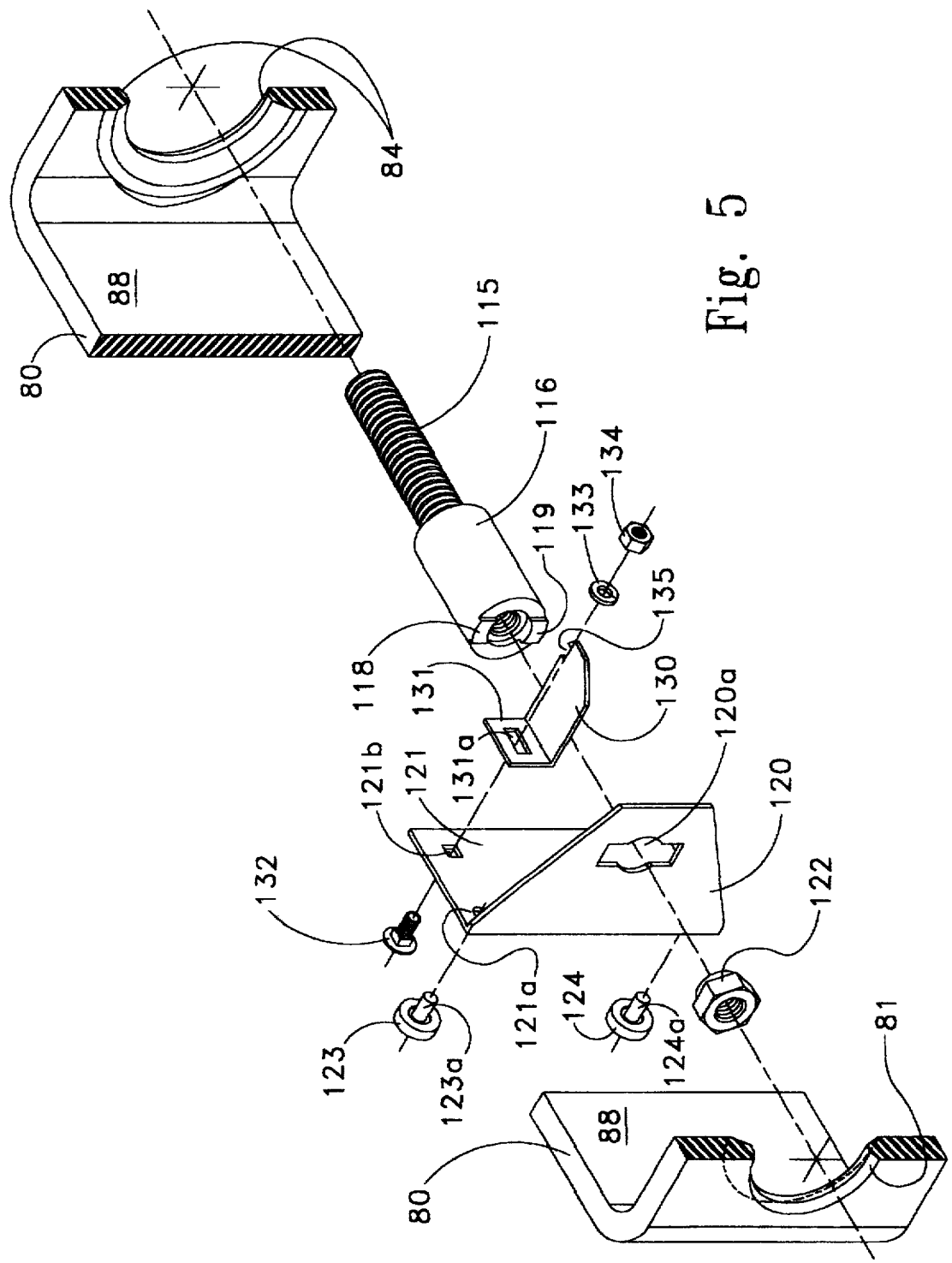
FIG. 5 is an exploded view of part of the yoke stem assembly, anti-rotation and position indicating elements of the valve of FIG. 1.

To prevent rotation of the stem assembly 41, 42 an anti-rotation assembly is provided. The anti-rotation assembly comprises an angular plate 120, as best seen in FIGS. 4 & 5, which has a slotted hole 120a for mating with corresponding integral keys 118, 119 at the lower end of the large diameter portion 116 of upper stem 42. For assembly, a nut 122 threadedly engages the upper threaded portion of lower stem upper portion 44 and tightly holds the plate 120 in proper position locked to upper stem 42. The outermost portion of the plate is bent upwardly ninety degrees to lie just inside the inner wall 88 of the yoke 80. The upwardly projecting portion 121 of the plate 120 is provided with holes 121a for receiving mounting pins 123a, 124a of a pair of nylon or other suitable tabs 123, 124. It can be understood that when the plate 120, its upwardly projecting portion 121 and the tabs 123, 124 are properly installed, as seen in FIG. 4, the stem assembly 41, 42 will not be allowed to rotate due to engagement of the tabs 123, 124 with the inner wall 88 of the yoke 80. However, the tabs 123, 124 will not prevent the stem assembly 41, 42 from moving upwardly or downwardly within the yoke 80. Therefore, rotation of the force transmitting member 95 and nut 110 will cause the stem assembly 41, 42 to move up or down but rotation of the stem assembly 41, 42 will be prevented by the anti-rotation assembly.

It will also be noted, both in FIGS. 4 and 5, that a radial arm 130 is attached to the upwardly bent portion 121 of the plate 120 by a bolt 132, lock washer 133 and nut 134 which passes through holes 121b, 131a in the plate 121 and the bent portion 131 of the arm 130, respectively. A notch 135 provides a point of reference on the radial arm or pointer 130, the purpose of which will be more fully understood hereafter (see FIG. 4a).

Attached to the lower end of the rotating force transmitting member 95 by a set screw 140 (shown ninety degrees out of position for clarity) is a cylindrical drum 141. The cylindrical drum 141 has a cylindrical cavity 142 which is of a slightly larger diameter than the diameter of large diameter portion 116 of the upper stem 42. In fact, the larger diameter portion 116 of the upper stem 42 may reciprocate within the cylindrical cavity 142. A wiper 143 may be provided at the lower end of the cylindrical cavity 142 to wipe the larger diameter portion 116 of upper stem 42 and to isolate the cavity 142 and the threaded portion 115 of the upper stem 42 from the exterior environment. The outer surface of the drum 141 is provided with indicia 145 which are helically disposed therearound. In fact, these indicia may be provided on a thin sheet of material which may be wrapped around the drum 141 so that it may be assembled to correspond with different types of flow control members and stem assemblies.

It will be noted as best seen in FIG. 4a, that the indicator slot 135 on the radial indicator arm or pointer 130 provides a right hand edge 136 and is alignable with a particular indicia or arrow head point 137 (next to "0" in FIGS. 4 and 4a) which indicates a particular position of the stem assembly 41, 42 and the control member or plug 40. In the case of FIG. 4 it represents the zero flow or closed position. If the force transmitting member 95 is rotated, causing the stem assembly 41, 42 to move upwardly within the valve, the drum 141 will rotate and the indicating arm or pointer 130 will move upwardly with the stem assembly 41, 42 so that the edge of the indicator slot 135 will be in registration with a specific indicia of indicia 145 to indicate a predetermined position of the stem assembly 41, 42 and it's attached plug or control member 40 and consequently a predetermined flow area through the valve. The position indicator components, drum 141 and pointer 130, are unique in that they provide accurate position indicating in a non-rotating rising stem without threaded engagement therewith.

Figure 6:
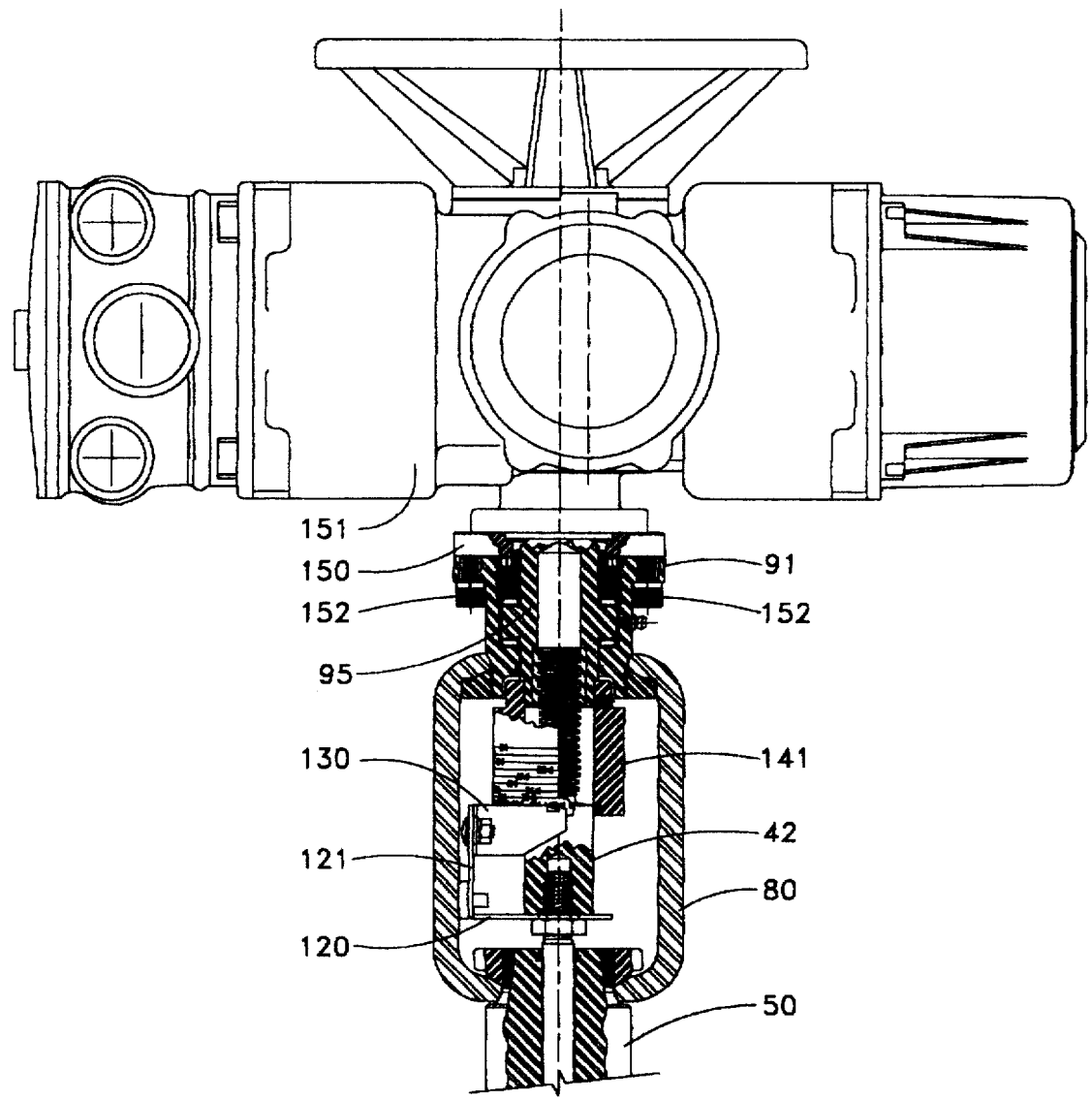
FIG. 6 is an elevation view, partially in section, showing the upper portion of a valve such as the valve of FIG. 1 adapted for attachment to an electrical operator.

The preferred embodiment of the invention described in FIGS. 1–5 is equipped with a manual handle or valve operator 102. The valve V can easily be adapted for connection to other type of operators. For example, as shown in FIG. 6, the handle 102 has been removed and an adapter plate 150, attached to the base of an operator 151, has been attached to the flange portion of the bearing housing 91 by a plurality of bolts 152 passing through radial holes 105. (See FIG. 4). This can be done without disturbing any other part of the valve V. The operation of the valve V would be unchanged except for the fact that the force transmitting member 95 would be rotated by the operator 151 rather than manually. The operator (electric or pneumatic operator) could be controlled from a satellite or other remote means.

Thus, the valve apparatus of the present invention provides a choke valve which is easy to operate, relatively simple in construction and easily adapted for different flow control trim and type of operators. Most importantly, the valve is provided with extremely accurate indicator means for precisely predetermined and controlled flow areas. A preferred embodiment discloses unique flow control elements in a plug and cage arrangement.

While a single embodiment and alternate operation thereof have been disclosed herein, many variations of the invention may be made without departing from the spirit of the invention. Accordingly, the scope of the invention is to be limited only by the claims which follow.

I claim:

1. Valve apparatus for controlling the flow of fluids from a source of pressurized fluid, said apparatus comprising:

a valve body having a valve chamber with an inlet and an outlet;

seat means carried in said valve chamber;

a flow control member carried in said valve chamber and axially movable with respect to said seat means from a closed position preventing flow of fluids between said inlet and said outlet and selected open positions which provide predetermined flow areas through which flow and pressure throttling of fluids from said inlet to said outlet may occur;

non-rotating stem means to one end of which said flow control member is attached for said axial movement thereof;

a valve bonnet attached to said valve body having a throughbore through which said stem means may slidingly reciprocate while moving said flow control member between said flow preventing position and said selected open positions;

rotating driver means supported from said valve bonnet and including a nut member threadedly engageable with another end of said stem means, for translating rotational movement of said driver means to axial movement of said stem means and said flow control member attached to said one end thereof; and operating means attached to said driver means for rotation thereof;

said valve apparatus being further characterized in that said stem means comprises an upper stem and a lower stem and said valve bonnet has formed therein a cylindrical cavity in which is provided an annular sealing assembly surrounding said lower stem in sliding and sealing engagement therewith, said lower stem having a lower large diameter portion and an upper smaller diameter portion, said annular sealing assembly having an upper seal assembly, a lower seal assembly and spacer means there between, said upper seal assembly slidingly and sealingly engaging said upper smaller diameter portion of said lower stem, said lower seal assembly slidingly and sealingly engaging said lower large diameter portion of said lower stem, said upper stem being of a diameter greater than said upper smaller diameter portion of said lower stem and providing threads by which said nut member of said driver means threadedly engages said another end of said stem means.

2. Valve apparatus as set forth in claim 1 in which said seat means comprises an annular seating surface sealingly engageable by an end of said flow control member to prevent flow of fluids between said inlet and outlet ports and an upwardly opening generally cylindrical cage means in which said flow control member may reciprocate between said flow preventing position and said selected open positions, the walls of said cage means being provided with one or more radial openings to provide said predetermined flow areas in response to said selected open positions of said flow control member.

3. Valve apparatus as set forth in claim 1 in which said spacer means provides an annular space surrounding said upper smaller diameter portion of said lower stem directly above said lower large diameter portion of said lower stem, said annular space being in fluid communication with said valve outlet through a small passage provided through said flow control member and said lower diameter portion of said lower stem to at least particularly pressure balance said stem means.

4. Valve apparatus as set forth in claim 1 in which said cylindrical cavity of said valve bonnet is of uniform diameter, said annular sealing assembly being held therein by a single retainer member.

5. Valve apparatus as set forth in claim 1 in which said driver means is supported from said valve bonnet by a yoke member having an upper opening for receiving a portion of said driver means and a lower opening for connecting said yoke member to said valve bonnet, said yoke member being opened along at lest one side thereof for physical and visual access to said upper stem, the interior of said yoke member and position indicating means disposed therein for precisely indicating the position of said flow control member and said predetermined flow areas.

6. Valve apparatus as set forth in claim 5 in which said upper and lower openings of said yoke member are provided with tapered surfaces for engagement with corresponding tapered surfaces of said driver means and said valve bonnet or members attached thereto to centrally align and axially space said driver means, said valve bonnet and said stem means.

7. Valve apparatus as set forth in claim 5 including anti-rotation means engaging with said stem means and preventing rotation thereof but permitting said axial movement thereof.

8. Valve apparatus as set forth in claim 5 in which said drum means is provided with means surrounding said upper stem to isolate said upper threaded end thereon from the environment surrounding said valve apparatus.

9. Valve apparatus as set forth in claim 8 in which said upper stem has a lower smooth cylindrical portion of a diameter greater than the diameter of said upper threaded portion and slightly less than the diameter of said drum cylindrical cavity, wiper means being provided at the lower end of said drum cavity slidingly engaging said smooth cylindrical portion of said upper stem to isolate said cavity and said upper threaded end of said upper stem from said environment.

10. Valve apparatus as set forth in claim 5 in which said driver means comprises a force transmitting member, to which said nut member is attached, rotatably supported by a bearing assembly in a bearing housing, said force transmitting member being engageable by said operating means to transmit an operating force through said nut member and said threaded upper end of said upper stem to axially move said stem means and said flow control member to selected positions.

11. Valve apparatus as set forth in claim 10 in which said operating means comprises a removable elongated handle which may be manually moved to apply said operating force to said force transmitting member, said handle being provided with locking means by which it may be prevented from moving, locking said stem means and said control means in a closed or any selected open position.

12. Valve apparatus as set forth in claim 11 in which said operating means comprises an electric motor which may be attached to said force transmitting member for rotation thereof without disturbing any components of said valve apparatus other than said elongated handle.

13. Valve apparatus as set forth in claim 11 in which said operating means comprises a fluid operated motor which may be attached to said force transmitting member for rotation thereof without disturbing any other components of said valve apparatus other than said elongated handle.

14. Valve apparatus as set forth in claim 10 in which said driver means and said position indicating means cooperate to form a sealed chamber in which said threaded upper end of said upper stem is isolated from the environment surrounding said valve apparatus.

15. Valve apparatus as set forth in claim 1 including bleed means attached to said valve body and provided with a port in fluid communication with said valve chamber which may be opened to relieve pressure within said valve chamber to the atmosphere, interlocking means connecting said valve bonnet and said bleed means preventing disturbance of said valve bonnet or any means by which said valve bonnet is attached to said valve body unless said bleed means port has been opened.

16. Valve apparatus as set forth in claim 1 in which said seat means is removably fastened in said valve chamber by a seat retainer which threadedly engages said valve body above said valve chamber.

17. Valve apparatus as set forth in claim 16 in which said seat retainer is engaged by said valve bonnet, preventing rotation of said seat retainer unless said valve bonnet is removed.

18. Valve apparatus for controlling the flow of fluids from a source of pressurized fluid, said apparatus comprising:

a valve body having a valve chamber with an inlet and an outlet;

seat means carried in said valve chamber;

a flow control member carried in said valve chamber and axially movable with respect to said seat means from a closed position preventing flow of fluids between said inlet and said outlet and selected open positions which provide predetermined flow areas through which flow and pressure throttling of fluids from said inlet to said outlet may occur;

non-rotating stem means to one end of which said flow control member is attached for said axial movement thereof;

a valve bonnet attached to said valve body having a throughbore through which said stem means may slidingly reciprocate while moving said flow control member between said flow preventing position and said selected open positions;

rotating driver means supported from said valve bonnet and including a nut member threadedly engageable with another end of said stem means, for translating rotational movement of said driver means to axial movement of said stem means and said flow control member attached to said one end thereof; and operating means attached to said driver means for rotation thereof;

said valve apparatus being further characterized in that said seat means comprises an annular seating surface sealingly engageable by an end of said flow control member to prevent flow of fluids between said inlet and outlet ports and an upwardly opening generally cylindrical cage means in which said flow control member may reciprocate between said flow preventing position and said selected open positions, the walls of said cage means being provided with one or more radial openings to provide said predetermined flow areas in response to said selected open positions of said flow control member, said cage means comprising an inner cage of relatively hard material replaceably engaging, in a sealing interference fit, an outer surrounding cage of relatively softer material, seal means being provided between said inner and outer cage, said radial cage openings being provided by cooperating inner and outer radial openings through said inner and outer cages, respectively.

19. Valve apparatus as set forth in claim 18 in which said inner cage openings are provided by elongated longitudinally disposed slots.

20. Valve apparatus as set forth in claim 19 in which said inner cage openings are formed of elongated slots at ends of which are holes forming keyhole shaped openings.

21. Valve apparatus as set forth in claim 19 in which said inner cage openings are formed of narrow elongated slots at ends of which are wider slots forming elongated keyhole shaped openings.

22. Valve apparatus for controlling the flow of fluids from a source of pressurized fluid, said apparatus comprising:

a valve body having a valve chamber with an inlet and an outlet;.

seat means carried in said valve chamber;

a flow control member carried in said valve chamber and axially movable with respect to said seat means from a closed position preventing flow of fluids between said inlet and said outlet and selected open positions which provide predetermined flow areas through which flow and pressure throttling of fluids from said inlet to said outlet may occur;

non-rotating stem means to one end of which said flow control member is attached for said axial movement thereof;

a valve bonnet attached to said valve body having a throughbore through which said stem means may slidingly reciprocate while moving said flow control member between said flow preventing position and said selected open positions;

rotating driver means supported from said valve bonnet and including a nut member threadedly engageable with another end of said stem means, for translating rotational movement of said driver means to axial movement of said stem means and said flow control member attached to said one end thereof; and operating means attached to said driver means for rotation thereof;

said valve apparatus being further characterized in that stem means comprises an upper stem and a lower stem and said valve bonnet has formed therein a cylindrical cavity in which is provided an annular sealing assembly surrounding said lower stem in sliding and sealing engagement therewith, the upper end of said upper stem being threaded for said threaded engagement with said driver means nut member, said driver means being supported from said valve bonnet by a yoke member having a lower opening for connecting said yoke member to said valve bonnet, said yoke member being opened along at least one side thereof for physical and visual access to said upper stem, the interior of said yoke member and position indicating means disposed therein for precisely indicating the position of said flow control member and said predetermined flow areas, said position indicating means comprising a cylindrical drum attached to said driver means for rotation therewith and providing a cylindrical cavity surrounding a portion of said upper stem, the outer surface of said drum having indicia thereon, said position indicating means also comprising pointer means attached to said stem means which in cooperation with said drum indicia indicates the specific position of said flow control member and a predetermined flow area between said inlet to said outlet.

23. Valve apparatus as set forth in claim 22 in which said upper stem may freely reciprocate within said cylindrical cavity without threaded engagement with said cylindrical drum.

24. Valve apparatus as set forth in claim 22 in which said drum indicia is helically disposed thereon, rotation of said driver means to move said flow control member from said closed position to said selected open positions positioning said helically disposed indicia with said pointer means to indicate said specific position of said flow control member and said predetermined flow area associated therewith.

25. Valve apparatus as set forth in claim 24 in which said drum indicia is provided on a thin flexible sheet of corrosion resistant material which may be wrapped around said drum without preforming, allowing said drum indicia to be changed for different types of flow control members and stem means.

* * * * *